Figure 1:
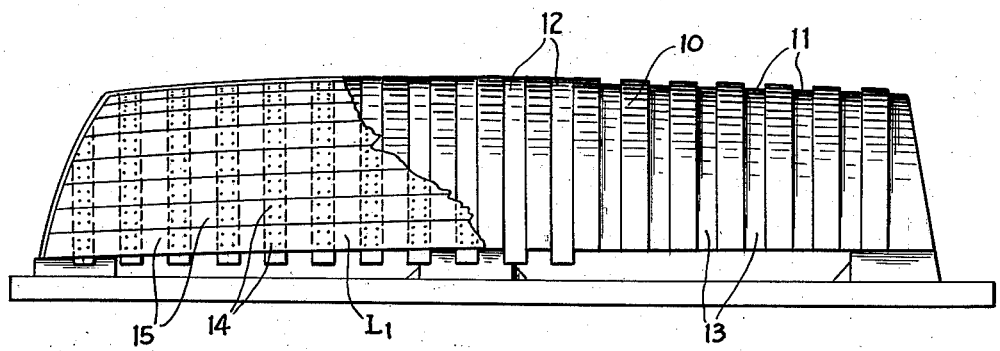

Sept. 25, 1951      R. M. BROWN      2,569,224

METHOD OF MAKING BOAT HULLS

Filed Nov. 14, 1949

Ralph Myron Brown
*Inventor*

By *Donald H. Stewart.*

Attorney

Patented Sept. 25, 1951

2,569,224

UNITED STATES PATENT OFFICE 2,569,224

METHOD OF MAKING BOAT HULLS

Ralph M. Brown, Penn Yan, N. Y., assignor to Penn Yan Boats, Inc., Penn Yan, N. Y., a corporation of New York Application November 14, 1949, Serial No. 127,225

2 Claims. (Cl. 9—6)

This invention relates to laminated hull structures for boats and to a method of making such a structure. One object of the invention is to provide a method of laminating a hull in which the proper positioning of the fastening members through the several laminations is assured. Another object of my invention is to provide a simple and effective method of building up laminations.

In small boat construction, it has been customary to build laminated hulls using a canvas layer between two planked layers, rendering the canvas layer waterproof with suitable paint, marine glue, or the like. However, canvas lacks the permanency desired and is subject to oxidizing and, even with the most improved treatment, tends to deteriorate, or rot, after prolonged usage as it ultimately absorbs water, and lying between planking loses its strength. Moreover, canvas is not ideal for other reasons. One being that after laying the first layer of planks on ribs and covering with canvas, it is difficult to lay on the second layer, or outer layer of planks, because it is difficult to determine just where fasteners will pass through to the ribs which are, of course, concealed by the canvas and the first plank layer. My invention is particularly directed to overcoming these difficulties.

Figure 2:
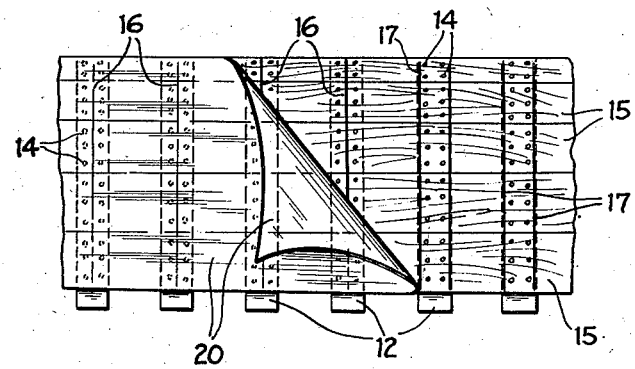
Figure 3:
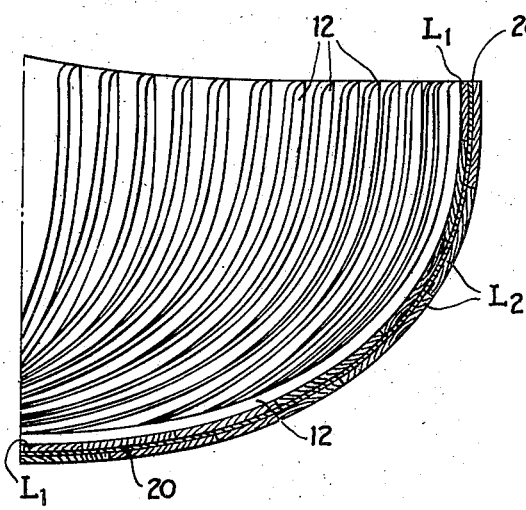

Coming now to the drawing wherein like reference characters denote like parts throughout:

Fig. 1 is a side elevation of a small boat hull, shown somewhat schematically with parts in different stages of construction, and illustrating a preferred embodiment of my invention;

Fig. 2 is an enlarged fragmentary view, also showing a part of a laminated hull structure. The relation of separate layers is shown; and Fig. 3 is a half section through the boat hull shown in Fig. 1 and showing the laminated hull in section. The dimensions of the section are exaggerated.

My invention comprises broadly a method of making the laminated hull in which a much more permanent hull can be produced with much greater ease, and in which the proper positioning of the inside and outside fasteners can be assured. Moreover, the assembly of the hull is not only improved, but the speed and accuracy of the assembly materially increased.

A preferred embodiment will now be described. In making small boat hulls, such as canoes, dinghies, and larger sail boats of light-weight construction, it is convenient to have a mold designated as 10 in Fig. 1, with grooves 11 of a size to receive U-shaped ribs 12 which are pre-bent and snapped into the grooves. These grooves include bottoms 13 preferably of steel sufficiently hard to turn the points of chisel-shaped nails 14. These nails may be driven through planks 15 to fasten the planks to the ribs 12 and as one plank at a time is added, it is a simple matter to drive the nails so they will strike the ribs.

In accordance with known practice, canvas would then be stretched over the inner layer L1 of the planking with marine glue, cement, or the like, but I omit this step, substituting a transparent plastic film, or sheet, for the canvas and entirely omitting the glue, or adhesives.

After the planking layer L1 is in place, I prefer to sand or smooth the planks and then mark the planks with a line 16 designating the centers of the ribs 12; or, if preferred, with lines 17 representing the edges of the ribs. This may be done with chalk, pencil, or the like.

The next step is to stretch a layer of transparent or translucent film 20 over the planking layer L1. This is preferably a single sheet, but more than one sheet may be used, if desired. A polyethylene film is useful, although any transparent or translucent film which is waterproof, stretchable, and not brittle, may be employed. Other materials may be vinylidene chloride and polyvinyl chloride acetate sheeting. The markings 16 or 17 can be seen through this transparent or translucent layer when the outer layer of planks L2 is applied. As each plank is placed on the film, the exact location of the fasteners can be determined, so that all the fasteners 14 will strike the ribs 12. If clinching points are used, they will pass through outer plank layer L2 and thence through sheeting 20, through the inner planking L1 and through the ribs 12. The steel bottoms 13 will turn the points back into the ribs. Other types of fasteners, such as rivets, or the like, may be used, if desired.

Not only does the translucent or transparent layer 20 permit the operator to rapidly plank the hull, but it forms a superior hull. It is waterproof. No cement is required. All the fasteners reach the ribs. It is not affected by the finish placed on the plank layers, as varnishes and lacquers do not oxidize the film. The planks may be treated with rot inhibitors, such as Cupernol. It needs no waterproofing compound and it does not absorb water. It is solely held in place by the layers of planking L1 and L2 and the fasteners. It does not hold moisture so there is no tendency for the planking layers L1 and L2 to rot.

If more than one sheet of film is used, the edges of the sheets may be permanently joined by known methods of cementing, welding, or the like. Special cements are known for the different types of sheeting.

I have described a preferred hull and method of making the same, and one which gives a complete and satisfactory method of obtaining the objects of my invention. Obviously, changes will suggest themselves to those skilled in the art. I contemplate, as within the scope of my invention, all such forms as may come within the scope of the appended claims.

I claim:

1. The method of making a laminated boat hull which comprises planking ribs with an inner layer of planking, fastening the planking to the ribs, marking on the outside of the planking the location of the ribs, applying a plastic film layer over the marked planking, said layer being sufficiently transparent to view the marking therethrough, applying one plank at a time of an outer layer of planking, fastening the outer layer of planks by fasteners passed through the outer planks, through the film and inner layer of marked planks, locating the fasteners by the marks on the inner planks visible through the plastic film, whereby the fasteners of the outer planks are guided into the ribs.

2. The method of making a laminated boat hull which comprises supporting ribs in position for a hull, applying an inner layer of planking on the ribs, marking the planking on the outside to indicate the position of the ribs, stretching without fastening a layer of waterproof, plastic, transparent film over the marked planks applied to the ribs, applying an outer layer of planks to the waterproof, plastic, transparent film and fastening the transparent film and outer planks by fasteners located in accordance with the markings on the inner planking layer showing through the transparent layer and driven through the inner planking layer and into the ribs.

RALPH M. BROWN.

REFERENCES CITED

The following references are of record in the file of this patent:

UNITED STATES PATENTS

| Number | Name | Date |
| --- | --- | --- |
| 1,744,561 | Marckworth | Jan. 21, 1930 |
| 2,163,998 | Higgins | June 27, 1939 |
| 2,165,545 | Grant | July 11, 1939 |
| 2,270,419 | Debo | Jan. 20, 1942 |
| 2,325,700 | Moss | Aug. 3, 1943 |